United States Patent
Jung et al.

(10) Patent No.: US 10,440,730 B2
(45) Date of Patent: Oct. 8, 2019

(54) METHOD CARRIED OUT BY TERMINAL FOR DETERMINING TRANSMISSION PRIORITY IN WIRELESS COMMUNICATION SYSTEM AND TERMINAL UTILIZING THE METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,042

(22) PCT Filed: Apr. 11, 2016

(86) PCT No.: PCT/KR2016/003790
§ 371 (c)(1),
(2) Date: Oct. 3, 2017

(87) PCT Pub. No.: WO2016/163851
PCT Pub. Date: Oct. 13, 2016

(65) Prior Publication Data
US 2018/0092112 A1    Mar. 29, 2018

Related U.S. Application Data

(60) Provisional application No. 62/145,525, filed on Apr. 10, 2015.

(51) Int. Cl.
*H04W 4/70* (2018.01)
*H04W 92/18* (2009.01)
(Continued)

(52) U.S. Cl.
CPC ......... *H04W 72/1247* (2013.01); *H04W 4/70* (2018.02); *H04W 72/10* (2013.01);
(Continued)

(58) Field of Classification Search
CPC .................. H04W 72/1247; H04W 88/02
(Continued)

(56) References Cited

U.S. PATENT DOCUMENTS

2014/0056220 A1* 2/2014 Poitau ............... H04W 76/14
370/328
2014/0321377 A1* 10/2014 Ryu ............... H04W 72/1247
370/329
(Continued)

FOREIGN PATENT DOCUMENTS

KR    10-2015-0010434 A    1/2015

OTHER PUBLICATIONS

3GPP TS 23.303 V12.4.0 (Mar. 2015), ("3rd Generation Partnership Project; Technical Specification Group Services and System Aspects; Proximity-based services (ProSe); Stage 2 (Release 12)") (Year: 2015).*
(Continued)

*Primary Examiner* — Yemane Mesfin
*Assistant Examiner* — Intekhaab A Siddiquee
(74) *Attorney, Agent, or Firm* — Birch, Stewart, Kolasch & Birch, LLP

(57) ABSTRACT

Provided is a method for a device-to-device (D2D) action carried out by a terminal in a wireless communication system, the method comprising the steps of: determining priorities for a first D2D action and a second D2D action; on the basis of the determined priorities, determining the D2D action to be carried out from among the first D2D action and second D2D action; and on the basis of the determined D2D
(Continued)

action to be carried out, carrying out any one D2D action from among the first D2D action and second D2D action.

5 Claims, 17 Drawing Sheets

(51) Int. Cl.
| | | |
|---|---|---|
| *H04W 88/02* | (2009.01) | |
| *H04W 4/90* | (2018.01) | |
| *H04W 72/12* | (2009.01) | |
| *H04W 72/10* | (2009.01) | |
| *H04W 76/14* | (2018.01) | |
| *H04W 8/00* | (2009.01) | |
| *H04W 48/12* | (2009.01) | |
| *H04W 48/20* | (2009.01) | |
| *H04W 88/04* | (2009.01) | |

(52) U.S. Cl.
CPC ........... *H04W 88/02* (2013.01); *H04W 92/18* (2013.01); *H04W 4/90* (2018.02); *H04W 8/005* (2013.01); *H04W 48/12* (2013.01); *H04W 48/20* (2013.01); *H04W 76/14* (2018.02); *H04W 88/04* (2013.01)

(58) Field of Classification Search
USPC .......................................................... 370/329
See application file for complete search history.

(56) References Cited

U.S. PATENT DOCUMENTS

| | | |
|---|---|---|
| 2015/0029866 A1 | 1/2015 | Liao et al. |
| 2015/0043446 A1 | 2/2015 | Tsirtsis et al. |

OTHER PUBLICATIONS

Lte Advanced, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Technical Specification, 3GPP TS 36.300 V12.5.0 (Mar. 2015).

Lte, "3rd Generation Partnership Project; Technical Specification Group Radio Access Network; Evolved Universal Terrestrial Radio Access (E-UTRA); User Equipment (UE) procedures in idle mode (Release 8)", Technical Specification, 3GPP TS 36.304 V8.5.0 (Mar. 2009).

\* cited by examiner

METHOD CARRIED OUT BY TERMINAL FOR DETERMINING TRANSMISSION PRIORITY IN WIRELESS COMMUNICATION SYSTEM AND TERMINAL UTILIZING THE METHOD

CROSS REFERENCE TO RELATED APPLICATIONS

This application is the National Phase of PCT/KR2016/003790 filed on Apr. 11, 2016, which claims priority under 35 U.S.C. § 119(e) to U.S. Provisional Application No. 62/145,525 filed on Apr. 10, 2015, all of which are hereby expressly incorporated by reference into the present application.

BACKGROUND OF THE INVENTION

Field of the Invention

The present invention relates to wireless communication and, more specifically, to a method for a D2D operation carried out by a terminal in a wireless communication system and a terminal using the same.

Related Art

In ITU-R (International Telecommunication Union Radio communication sector),
standardization of IMT (International Mobile Telecommunication)-Advanced which is a next-generation mobile communication system following the third generation mobile communication system is performed. IMT-Advanced aims to support IP (Internet Protocol) based multimedia services with a rate of 1 Gbps in a stop and low-speed moving state and 100 Mbps in a high-speed moving state.

3GPP (3rd Generation Partnership Project) is a system standard which meets requirements of IMT-Advanced and prepares LTE (Long Term Evolution)-Advanced (LTE-A) evolving from LTE based on OFDMA (Orthogonal Frequency Division Multiple Access)/SC-FDMA (Single Carrier-Frequency Division Multiple Access) transmission schemes. LTE-A is a leading candidate for IMT-Advanced.

Recently, there is increasing interest in D2D (Device-to-Device) technology based on direct communication between devices. Particularly, D2D attracts attention as a communication technology for a public safety network. While commercial communication networks rapidly change to LTE, current public safety networks are based on 2G technology due to problems of collision with existing communication protocols and cost. Demand for improvement of such technical differences and services has led to efforts to enhance public safety networks.

Public safety networks have higher service requirements (reliability and security) than commercial communication networks and, particularly, require direct signal transmission and reception between devices, that is, D2D operation, even when coverage of cellular communication does not cover the networks or is not available.

D2D operation may have various advantages in terms of signal transmission and reception between devices adjacent to each other. For example, D2D UEs can perform data communication with high transfer rate and low delay. In addition, D2D operation can disperse traffic converging on a base station, and if a D2D UE serves as a relay, can extend coverage of the base station.

Presently, separate priorities are not assigned to D2D operations. The current D2D direct discovery operation has lower priority than a D2D direct communication operation. That is, when the D2D direct discovery operation and the D2D direct communication operation compete, a UE performs the D2D direct communication operation first and drops or defers the D2D direct discovery operation.

It may be desirable to perform the D2D direct communication operation for communicating with other UEs in preference to the D2D direct discovery operation for discovering a D2D supportable UE.

However, when the D2D direct discovery operation is used with respect to critical operations or safety for services (e.g., V2X service), it may be desirable to apply higher priority to the D2D direct discovery operation than the D2D direct communication operation.

Accordingly, the present invention provides a method and a device for allocating priority per D2D operation such that a UE performs a D2D operation (e.g., D2D direct communication or D2D direct discovery) on the basis of the priority.

SUMMARY OF THE INVENTION

An object of the present invention is to provide a method for a D2D operation carried out by a terminal in a wireless communication system and a terminal using the same.

In an aspect, a method for a D2D (device-to-device) operation carried out by a terminal in a wireless communication system is provided. The method comprises determining priorities for a first D2D operation and a second D2D operation, determining a D2D operation to be performed from among the first D2D operation and the second D2D operation on the basis of the determined priorities and carrying out any one of the first D2D operation and the second D2D operation on the basis of the determined D2D operation to be performed.

The first D2D operation may be a D2D discovery operation and the second D2D operation is a D2D communication operation.

When priority of the D2D discovery operation differs from priority of the D2D communication operation, the carrying out of any one of the first D2D operation and the second D2D operation may comprise dropping a D2D operation having lower priority from among the priority of the D2D discovery operation and the priority of the D2D communication operation, and performing a D2D operation having higher priority from among the priority of the D2D discovery operation and the priority of the D2D communication operation.

The D2D discovery operation is related to a V2X (vehicle-to-everything) application, the D2D communication operation may be not related to the V2X application, and the priority of the D2D discovery operation is higher than the priority of the D2D communication operation.

When the D2D discovery operation and the D2D communication operation have the same priority, the carrying out of any one of the first D2D operation and the second D2D operation may comprise dropping any one of the D2D discovery operation and the D2D communication operation and performing a D2D operation other than the dropped D2D operation.

The D2D discovery operation may be related to public safety communication and the D2D communication operation may be related to public safety.

The D2D discovery operation may be related to a sidelink relay service and the D2D communication operation is related to public safety.

The first D2D operation may be a first D2D discovery operation and the second D2D operation is a second D2D discovery operation.

When priority of the first D2D discovery operation differs from priority of the second D2D discovery operation, the carrying out of any one of the first D2D operation and the second D2D operation may comprise dropping a D2D discovery operation having lower priority from among the priority of the first D2D discovery operation and the priority of the second D2D discovery operation and performing a D2D discovery operation having higher priority from among the priority of the first D2D discovery operation and the priority of the second D2D discovery operation.

The first D2D discovery operation may be related to a sidelink relay service, the second D2D discovery operation is not related to the sidelink relay service, and the priority of the first D2D discovery operation is higher than the priority of the second D2D operation.

The first D2D discovery operation may be related to a V2X (vehicle-to-everything) application, the second D2D discovery operation may be not related to the V2X application, and the priority of the first D2D discovery operation is higher than the priority of the second D2D discovery operation.

When the first D2D discovery operation and the second D2D discovery operation may have the same priority, the carrying out of any one of the first D2D operation and the second D2D operation may comprise dropping any one of the first D2D discovery operation and the second D2D discovery operation and performing a D2D discovery operation other than the dropped D2D discovery operation.

The first D2D operation may be a first D2D communication operation and the second D2D operation may be a second D2D communication operation.

When priority of the first D2D communication operation differs from priority of the second D2D communication operation, the carrying out of any one of the first D2D operation and the second D2D operation may comprise dropping a D2D communication operation having lower priority from among the priority of the first D2D communication operation and the priority of the second D2D communication operation and performing a D2D communication operation having higher priority from among the priority of the first D2D communication operation and the priority of the second D2D communication operation.

When the first D2D communication operation and the second D2D communication operation have the same priority, the carrying out of any one of the first D2D operation and the second D2D operation may comprise dropping any one of the first D2D communication operation and the second D2D communication operation and performing a D2D communication operation other than the dropped D2D communication operation.

In another aspect, a terminal is provided. The terminal comprises a radio frequency (RF) unit configured to transmit and receive RF signals and a processor connected to the RF unit to operate, wherein the processor is configured to determine priorities for a first D2D operation and a second D2D operation, to determine a D2D operation to be performed from among the first D2D operation and the second D2D operation on the basis of the determined priorities, and to carry out any one of the first D2D operation and the second D2D operation on the basis of the determined D2D operation to be performed.

According to the present invention, a method for a D2D operation carried out by a terminal in a wireless communication system and a terminal using the same are provided.

According to the present invention, in D2D operations of a UE, priority can be allocated per D2D operation performed by the UE. Accordingly, the UE can selectively perform a D2D operation on the basis of the allocated priority. That is, when a ProSe direct communication operation and a D2D direct discovery operation compete, the UE does not unconditionally perform the D2D direct communication operation first, and when the D2D direct discovery operation is more important than the D2D direct communication operation, can preferentially carry out the D2D direct discovery operation. Accordingly, the UE according to the present invention can appropriately perform D2D operations necessary therefor, improving wireless communication efficiency.

DESCRIPTION OF EXEMPLARY EMBODIMENTS

Figure 1:
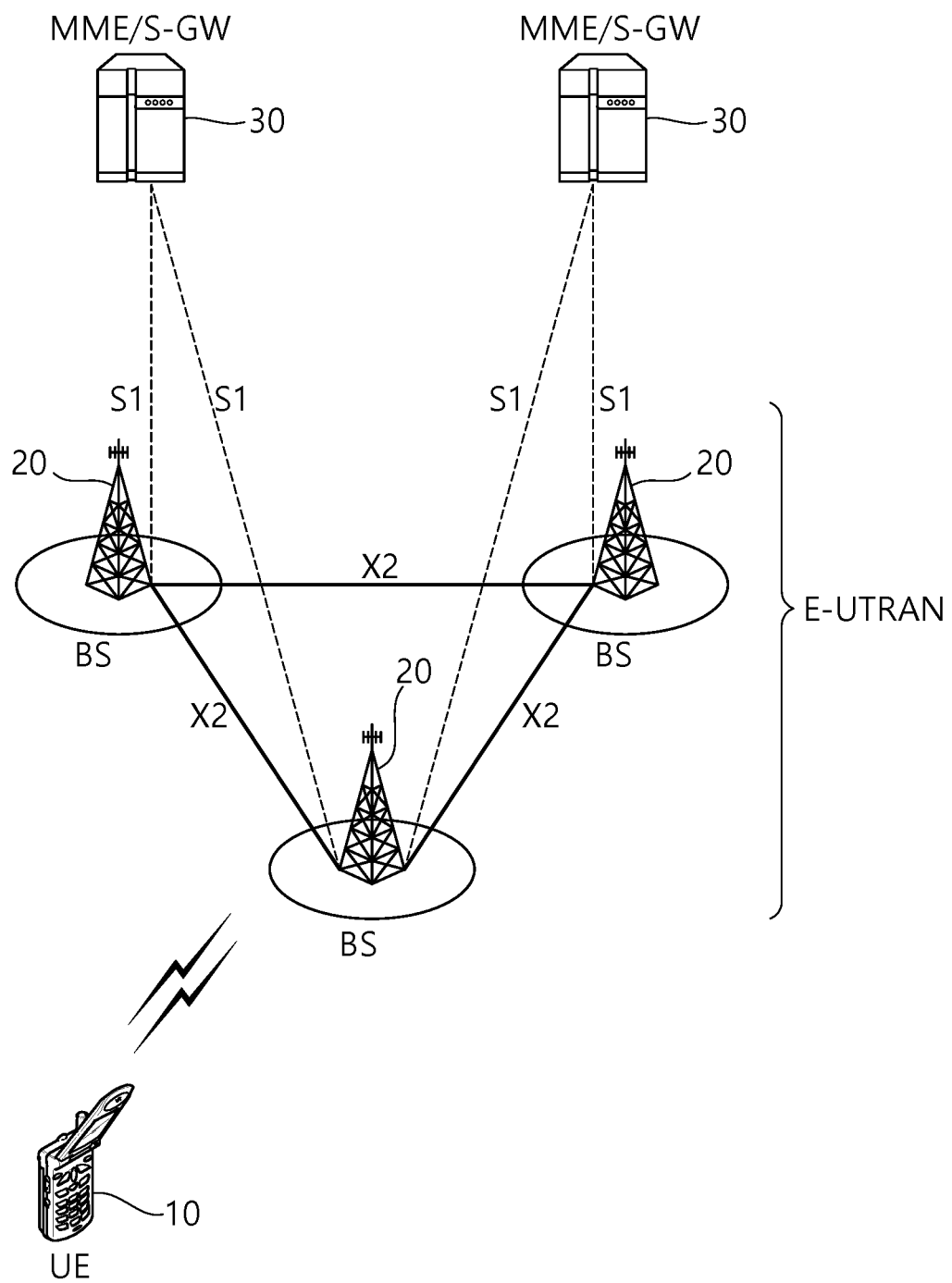
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
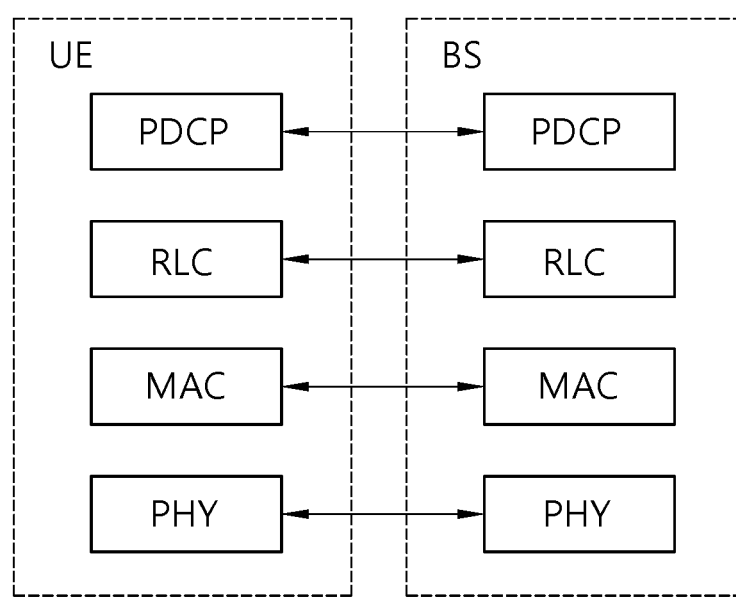
FIG. 2 is a diagram showing a wireless protocol architecture for a user plane.
Figure 3:
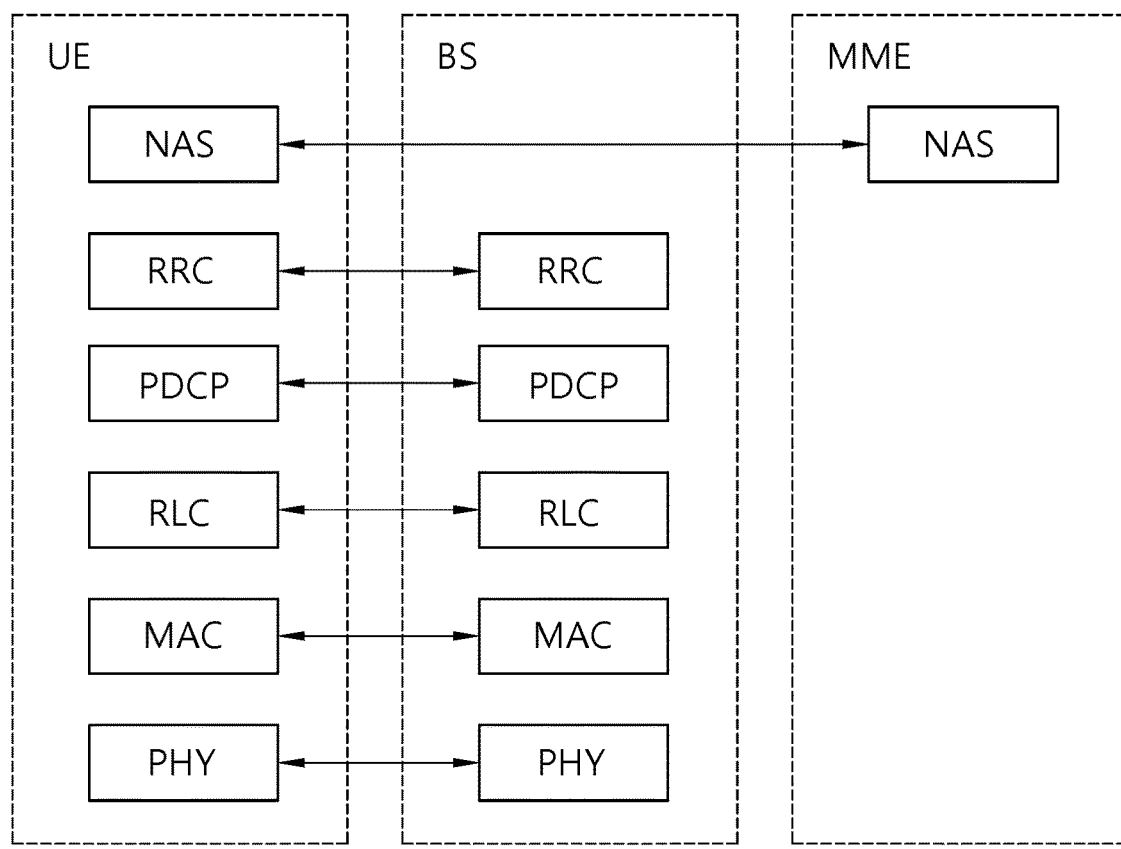
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
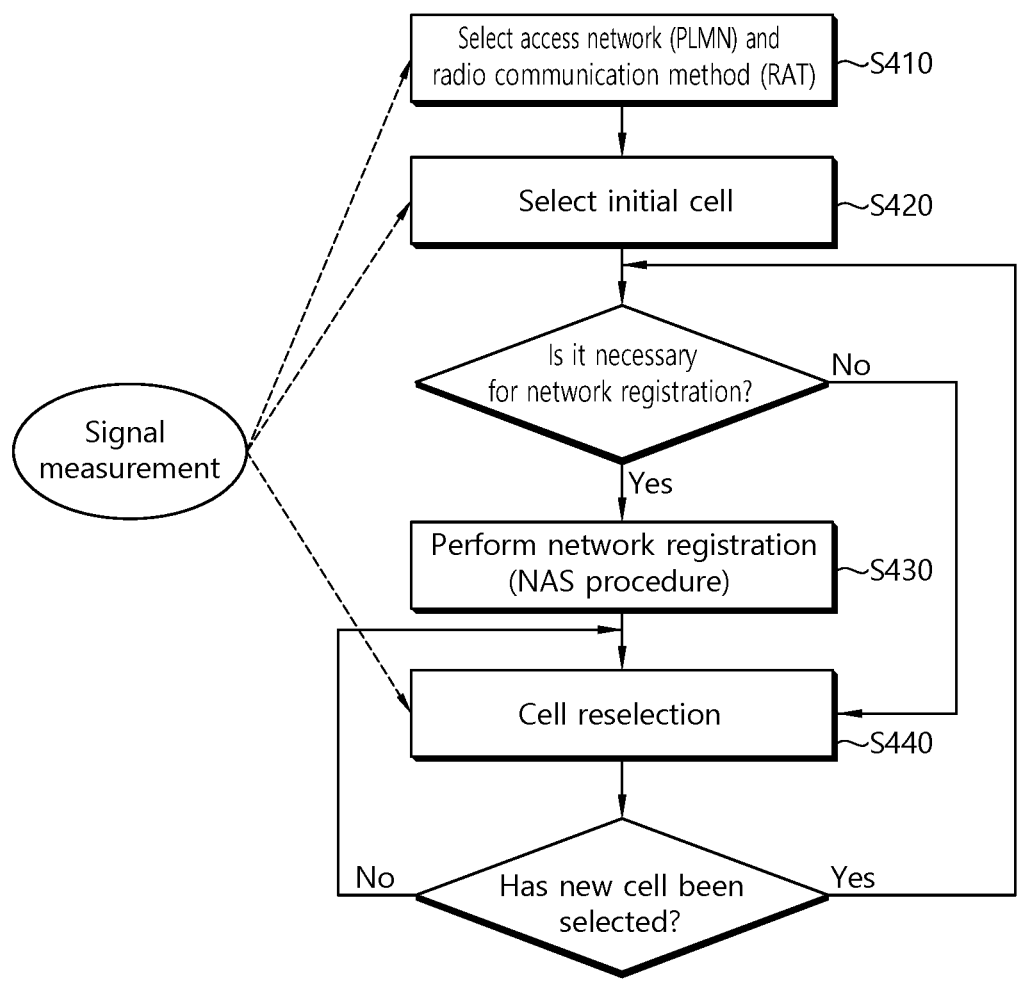
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
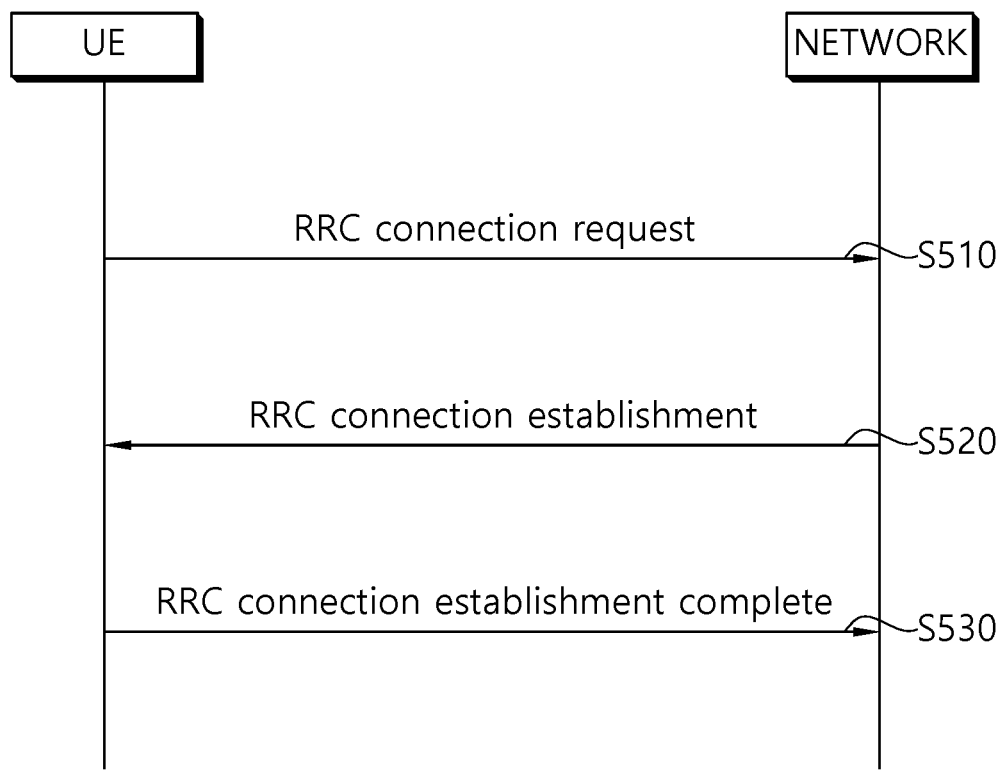
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
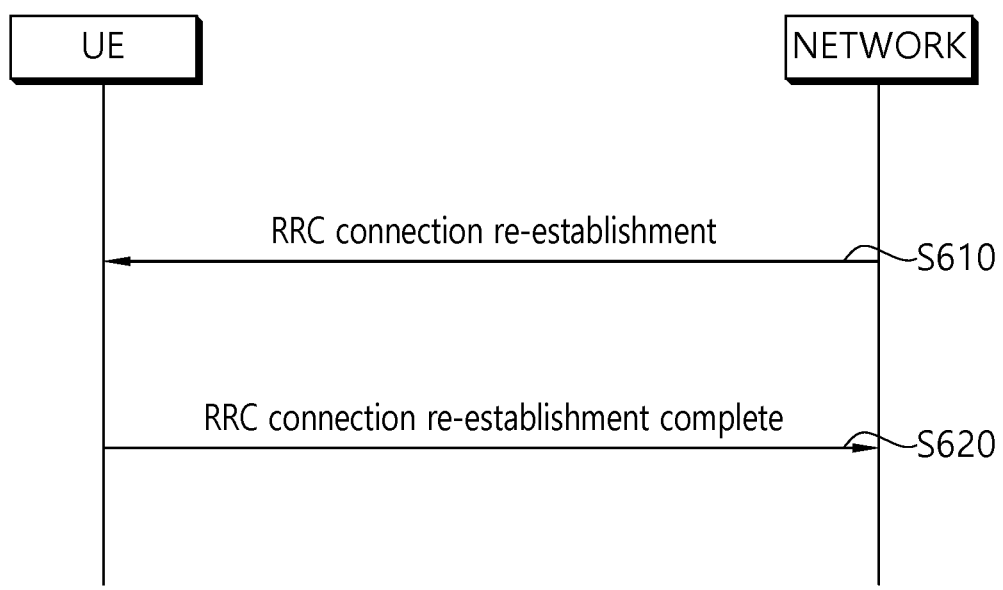
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/

EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$\text{Srxlev} > 0 \text{ AND Squal} > 0. \quad [\text{Equation 1}]$$

where:

$$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} - Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst} \quad R_n = Q_{meas,n} - Q_{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
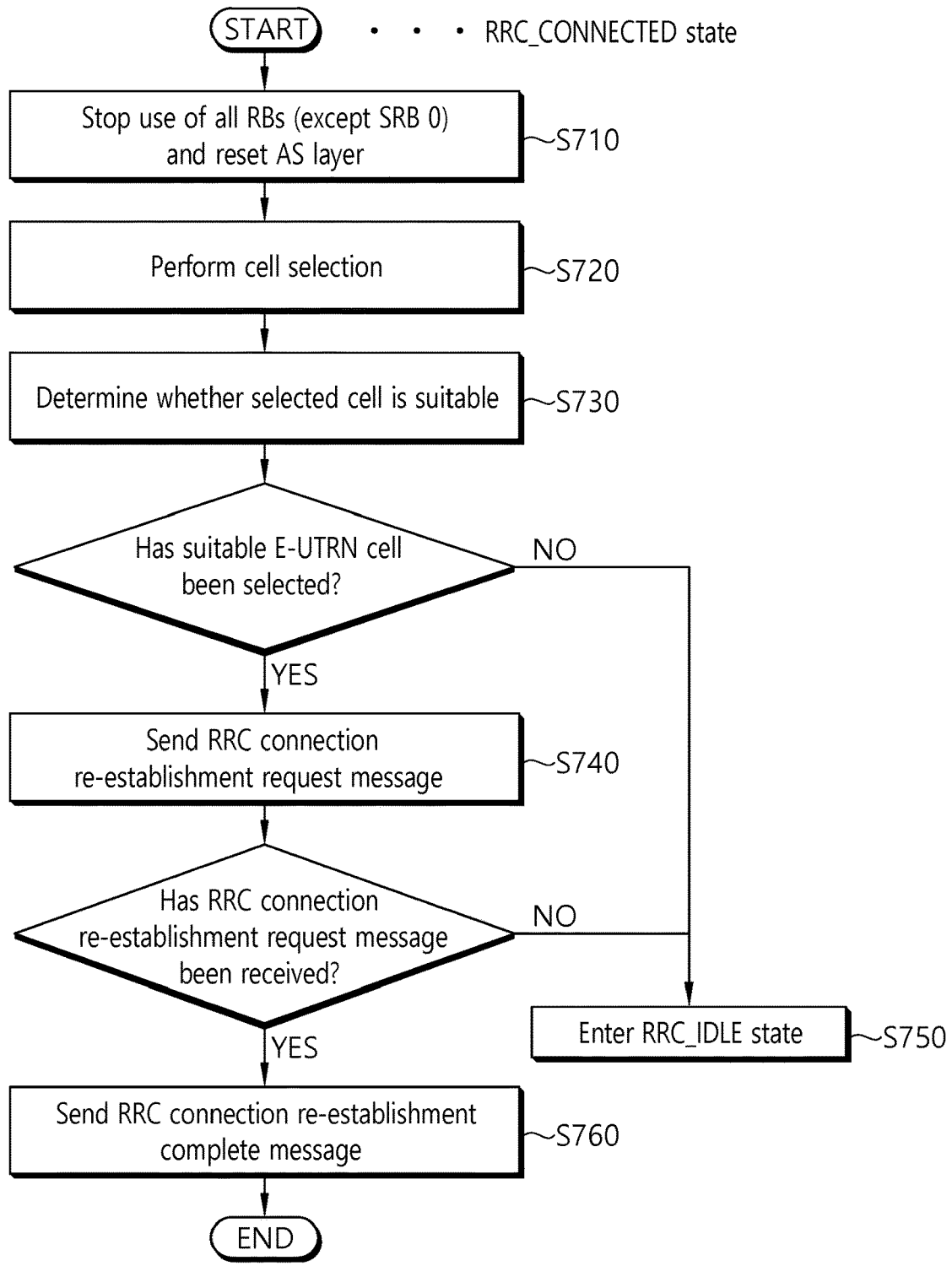
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
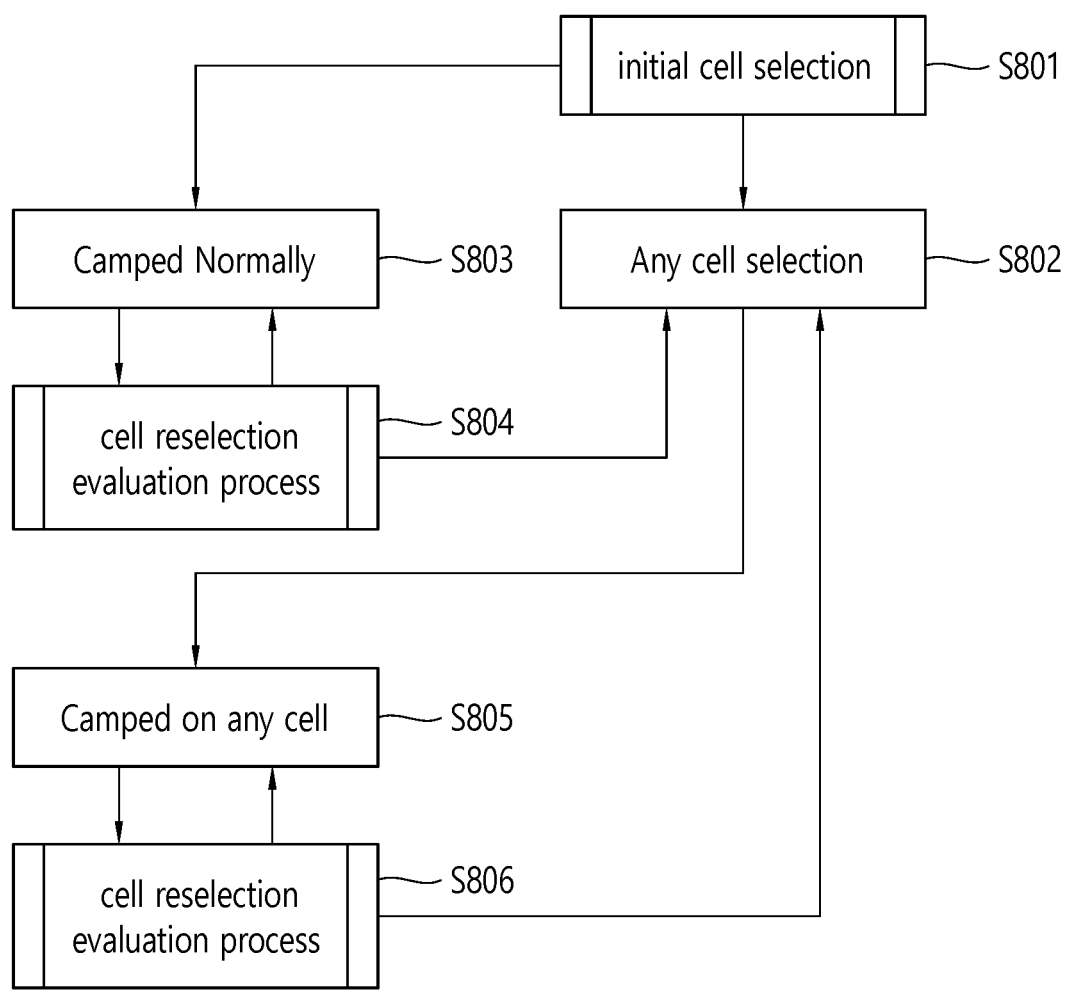
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
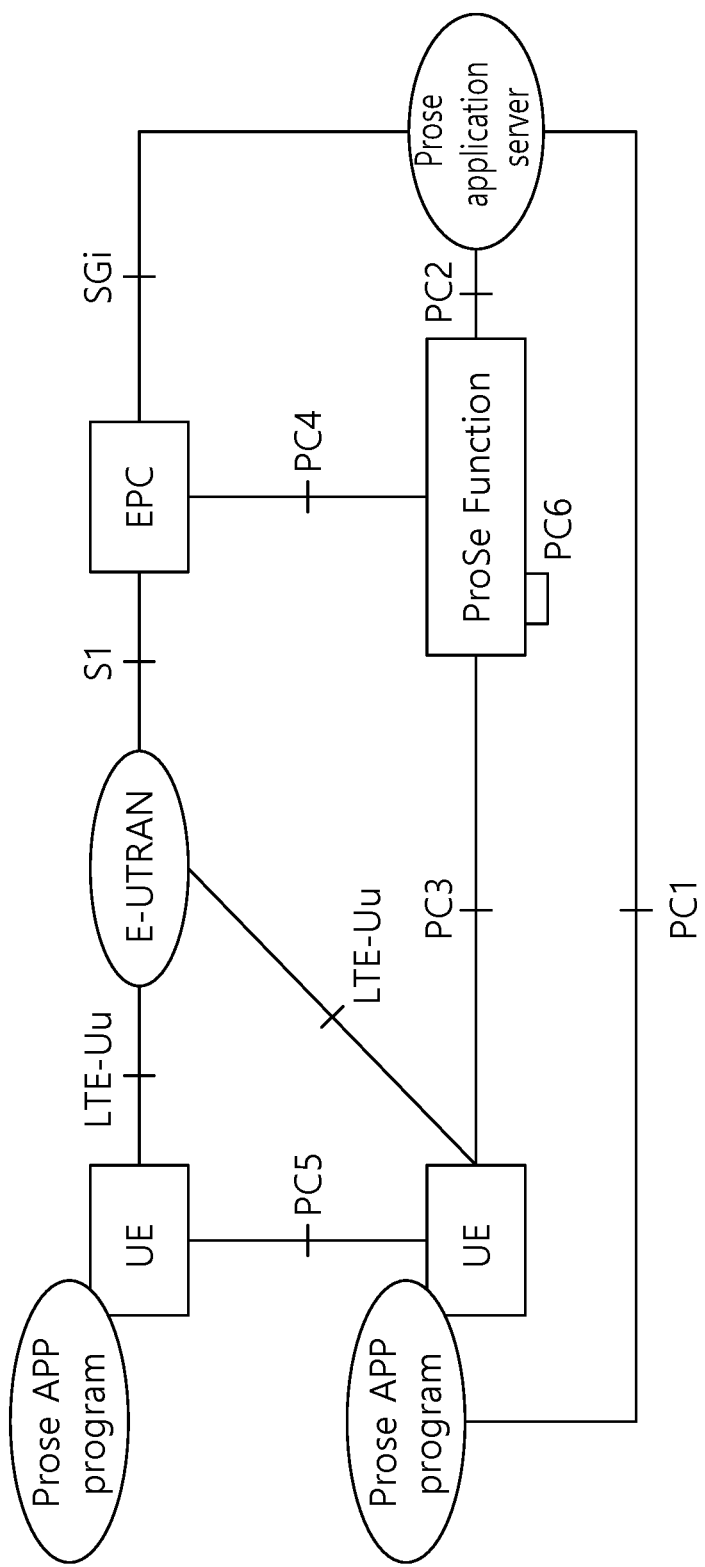
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
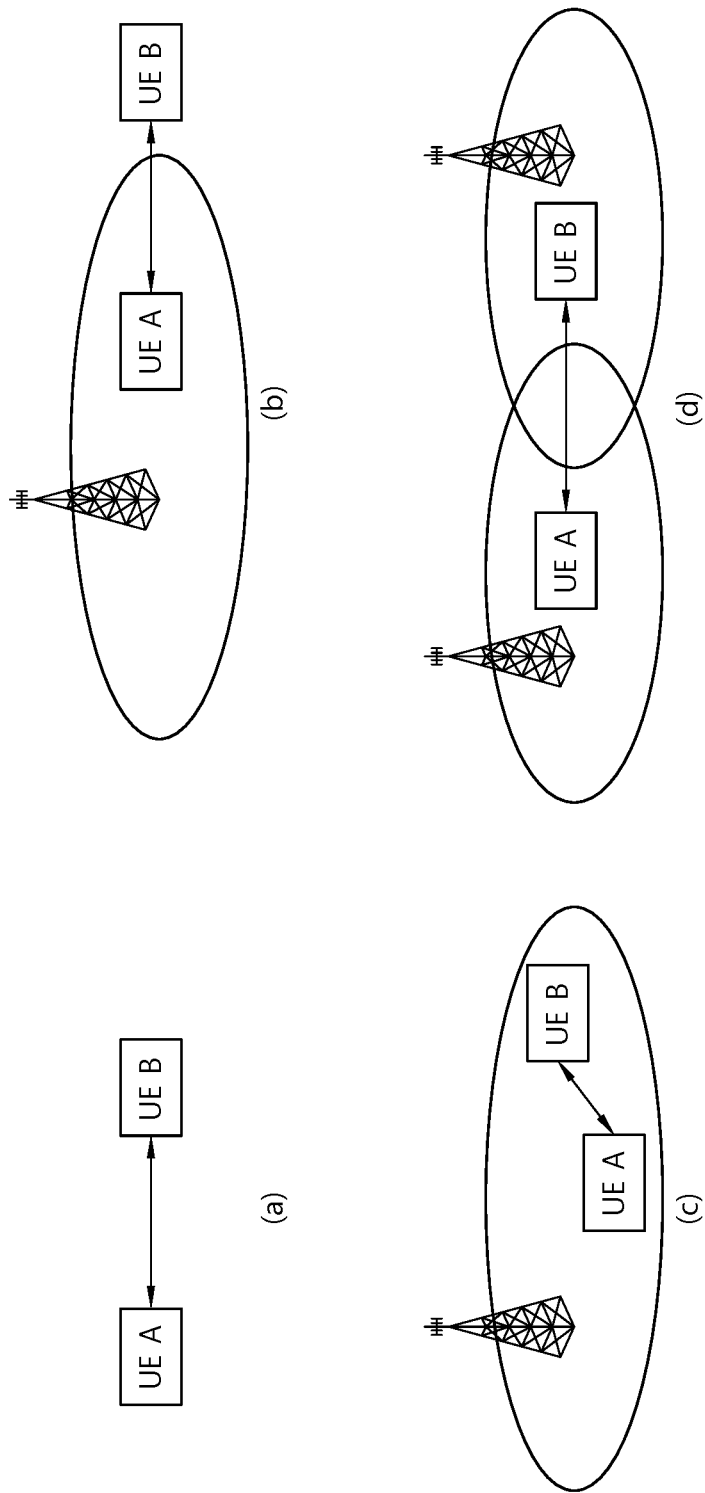
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
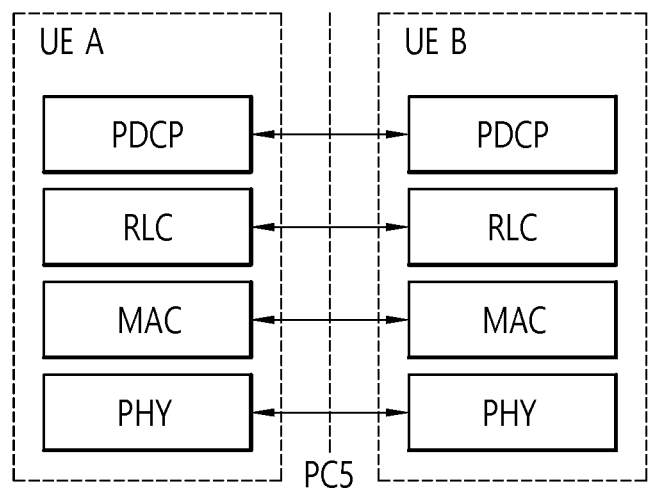
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
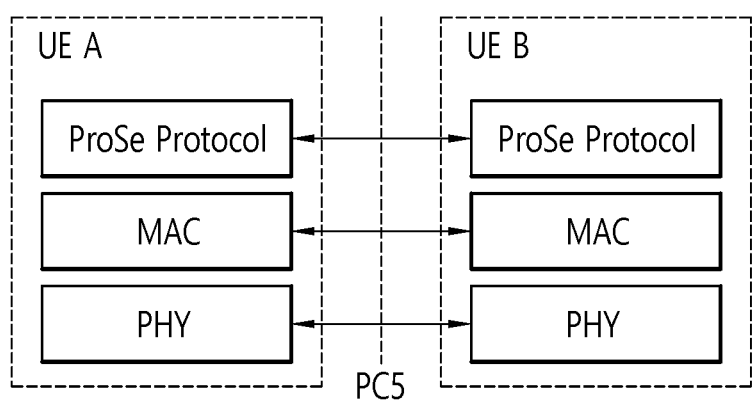
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

<Sidelink UE Information>

A sidelink UE information message may be used for indication of sidelink information to a network.

The sidelink UE information message may include the following information.

```
-- ASN1START
SidelinkUEInformation-r12 ::=        SEQUENCE {
    criticalExtensions                   CHOICE {
        c1                                   CHOICE {
            sidelinkUEInformation-r12            SidelinkUEInformation-r12-IEs,
            spare3 NULL, spare2 NULL, spare1 NULL
        },
        criticalExtesionsFuture              SEQUENCE { }
    }
}
SidelinkUEInformation-r12-IEs ::= SEQUENCE {
    commRxInterestedFreq-~12             ARECN-ValueEUTRA-r9
    OPTIONAL,
    commTxResourceReq-r12                SL-CommTxResourceReg-r12 OPTIONAL,
    discRXInterest-r12                   ENUMERATED {true}
    OPTIONAL,
    discTxResurceReq-r12                 INTEGER (1..63)
    OPTIONAL,
    lateNonCriticalExtension             OCTET STRING
    OPTIONAL,
    nonCriticalExtension                 SEQUENCE { }
    OPTIONAL
}
SL-CommTxResourceReq-r12 ::-         SEQUENCE {
    carrierFreq-r12                              ARECN-ValueEUTRA-r9
    OPTIONAL,
    destinationInfoList-r12                      SL-DestinationInfoList-r12
}
SL-DestinationInfoList-r12 ::=    SEQUENCE (SIZE (1..maxSL-Dest-r12)) OF SL-
DestinationIdentity-r12
SL-DestinationIdentity-r12 ::=    BIT STRING (SIZE (24))
-- ASN1STOP
```

'commRxInterestedFreq' may be information indicating a frequency with respect to UE reception in sidelink direct communication.

'commTxResourceReq' may be information indicating a frequency with respect to UE transmission in sidelink direct communication. In addition, 'commTxResourceReq' may be information indicating a sidelink direct communication transmission destination requested to a network by a UE for allocation of dedicated resources.

'discRxInterest' may be information indicating a UE which is interested in monitoring sidelink direct discovery announcement.

'discTxResourceReq' may be information indicating the number of resources requested by a UE every discovery period with respect to transmission of sidelink direct discovery announcement. 'discTxResourceReq' may affect the number of separate discovery messages that the UE wants to transmit every discovery period.

'destinationInfoList' may be information indicating a destination identified by a ProSe layer-2 group ID.

<System Information Block Type 5>

An information element (IE) of system information block type 5 (SIB5) can include only information related to inter-frequency cell reselection (i.e., information related to an inter-frequency of a related neighboring cell with respect to other network frequencies and cell reselection). The element may include a common cell reselection parameter with respect to frequencies in addition to a cell-specific reselection parameter.

The IE of system information block type 5 may include the following information.

```
-- ASN1START
SystemInformationBlockType5 ::-          SEQUENCE {
    interFreqCarrierFreqList                 InterFreqCarrierFreqList,
    ...,
    lateNonCriticalExtension                 OCTET STRING      (CONTAINING
SystemInformationBlockType5-v8h0-IEs)                          OPTIONAL
}
SystemInformationBlockTypeb-v8h0-IEs ::=   SEQUENCE {
    interFreqCarrierFreqList-v8h0 SEQUENCE (SIZE (1..maxFreq)) OF InterFreqCarrierFreqInfo-
v8h0                      OPTIONAL,         -- Need OP
    nonCriticalExtension                     SystemInformationBlockType5-v9e0-IEs     OPTIONAL
}
SystemInformationBlockType5-v9e0-IEs ::=   SEQUENCE {
    interFreqCarrierFreqList-v9e0 SEQUENCE (SIZE (1..maxFreq)) OF InterFreqCarrierFreqInfo-
v9e0                      OPTIONAL,         -- Need OR
    nonCriticalExtension                     SEQUENCE { }
        OPTIONAL
}
InterFreqCarrierFreqList ::=               SEQUENCE (SIZE (1..maxFreq)) OF
InterFreqCarrierFreqInfo
InterFreqCarrierFreqInfo ::=   SEQUENCE {
    d˙-CarrierFreq                                                    ARFCN-ValueEUTRA,
    q-RxLevMin                                                        Q-RxLevMin,
    p-Max                                                                          P-Max
                             OPTIONAL,         -- Need OP
    t-ReselectionEUTRA                       T-Reselection,
    t-ReselectionEUTRA-SF                    SpeedStateScaleFactors
OPTIONAL,             -- Need OP
    treshX-High                              ReselectionThreshold,
    treshX-Low                                     ReselectionThreshold,
    allowedMeasBandwidth                     ALLowedMeasBandwidth,
    presenceAntennaPort1                     PresenceAntennaPort1,
    cellReselectionPriority                         CellReselectionPriority
OPTIONAL,             -- Need OP
    neighCellConfig                                 NeighCellConfig,
    q-OffsetFreq                             Q-OffsetRange
        DEFAULT dB0,
    interFreqNeighCellList                   InterFreqNeighCellList
OPTIONAL,             -- Need OR
    interFreqBlackCellList                   InterFreqBlackCellList
OPTIONAL,             -- Need OR
    ...,
    [:  q-QualMin-r9                         Q-QualMin-r9
        OPTIONAL,             -- Need OP
        threshX-Q-r9                         SEQUENCE {
            threshX-HighQ-r9                 ReseletionThresholdQ-r9,
            threshX-LowQ-r9                          ReselectionThresholdQ-r9
        ]
                             OPTIONAL          -- Cond RSRQ
    ]:,
    [:  q-QualMinWB-r11                      Q-QualMin-r9
        OPTIONAL-- Cond WB-RSRQ
    ]:
}
InterFreqCarrierFreqInfo-v8h0 ::=    SEQUENCE {
    multiBandInfoList                        MultiBandInfoList
        OPTIONAL-- Need OR
}
InterFreqCarrierFreqInfo-v9e0 ::= SEQUENCE {
    dl-CarrierFreq-v9e0                      ARFCN-ValueEUTRA-v9e0
```

```
                                                                    OPTIONAL,       -- Cond di-FreqMax
    multiBandInfoList-v9e0                          MultiBandInfoList-v3e0    OPTIONAL
        -- Need OR
}
InterFreqNeighCellList ::=                          SEQUENCE (SIZE 1..maxCellInter)) OF
InterFreqNeighCellInfo
InterFreqNeighCellInfo ::=                          SEQUENCE {
    physCellId                                              PhysCellId,
    q-OffsetCell                                            Q-OffsetRange
}
InterFreqBlackCellList ::=                          SEQUENCE (SIZE (1..maxCellBlack)) OF
PhysCellIdRange
-- ASN1STOP
```

'interFreqBlackCellList' may be information indicating a list of inter-frequency neighboring cells processed as a black list.

'interFreqCarrierFreqList' may be information indicating a list of neighboring inter-frequencies.

'interFreqNeighCellList' may be information about a list of inter-frequency neighboring cells along with specific cell reselection parameters.

'multiBandInfoList' may information indicating a list of frequency bands in addition to bands in which cell reselection parameters appear according to a common 'dl-Carrier-Freq' (here, 'dl-CarrierFreq' may refer to a carrier frequency which aids in cell search of a UE).

'p-Max' may refer to a value applicable to a neighboring network cell on a carrier frequency.

<System Information Block Type 19>

Components of system information type 19 (SIB19) can indicate information about support of a sidelink UE information procedure by a network. In addition, the components of system information type 19 may include sidelink direct discovery associated with resource configuration information.

System information block type 19 may include the following information.

'discInterFreqList' may be information indicating neighboring frequencies for which a sidelink direct discovery announcement is supported.

'discRxPool' may refer to information indicating resources through which a UE is permitted to receive a sidelink direct discovery announcement while the UE is in RRC idle and RRC connection states.

'discSyncConfig' may be information indicating a configuration in which a UE is permitted to transmit and receive synchronization information.

'discTxPoolCommon' may be information indicating resources through which a UE is permitted to transmit a sidelink direct discovery announcement while the UE is in an RRC idle state.

'plmn-IdentityList' may be a list of PLMN identities with respect to a neighboring frequency indicated by a carrier frequency.

'plmn-Index' may refer to an index of a corresponding entry in plmn-IdentityList belonging to SIB1.

Hereinafter, the present invention will be described in detail.

As described above, in D2D operations (or ProSe operations), one of a plurality of UEs supporting D2Ds operation can announce information which can be used by a UE

```
-- ASN1START
SystemInformationBlockType19-r12 ::= SEQUENCE {
    discConfig-r12                                      SEQUENCE {
        discRxPool-r12                                      SL-DiscRxPoolList-r12,
        discTxPoolCommon-r12                            SL-DiscTxPoolList-r12
            OPTIONAL,   -- Need OR
        discTxPowerInfo-r12                             SL-DiscTxPowerInfoList-r12
            OPTIONAL,   -- Cond Tx
        discSyncConfig-r12                              SL-SyncConfigList-r12
            OPTIONAL    -- Need OR
    }
                                                        OPTIONAL,       -- Need OR.
    discInterFreqList-r12                               SL-CarrierFreqInfoList-r12
        OPTIONAL,   -- Need OR
    lateNonCriticalExtension                        OCTET STRING
        OPTIONAL,
    ...
}
SL-CarrierFreqInfoList-r12 ::=   SEQUENCE (SIZE (1..maxFreq)) OF SL-CarrierFreqInfo-r12
SL-CrrrierFreqInfo-r12::=        SEQUENCE {
    carrierFreq-r12                                     ARFCN-ValueEUTRA-r9,
    plmn-IdentityList-r12                           PLMN-IdentityList4-r12
        OPTIONAL    -- Need OP
}
PLMN-IdentityList4-r12 ::=       SEQUENCE (SIZE (1..maxPLMN-r11)) OF       PLMN-
IdentityInfo2-r12
PLMN-IdcntityInfo2-r12 ::=                       CHOICE {
    plmn-Index-r12                                      INTEGER (1..maxPLMN-r11),
    plmnIdentity-r12                             PLMN-Identity
}
-- ASN1STOP
``` supporting D2D operations in order to perform D2D operations. That is, one UE supporting D2D operations can notify other UEs that the UE (i.e., one UE supporting the D2D operations) supports the D2D operations. In other words, the UE supporting the D2D operations can perform a sidelink direct discovery announcement. Here, the discovery announcement can be performed through discovery resources configured by the RRC layer. In addition, another UE of the plurality of UEs supporting the D2D operations can monitor D2D information announced by the other UE, that is, discovery announcement, in order to perform D2D operations.

The aforementioned discovery operation may be called a ProSe direct discovery operation or a discovery operation.

In addition, a communication operation performed between two or more neighboring UEs in D2D operations (or ProSe operations) may be called a ProSe direct communication operation.

Presently, the ProSe direct discovery operation has lower priority than the ProSe direct communication operation. That is, when the ProSe direct discovery operation and the ProSe direct communication operation compete, a UE performs the ProSe direct communication operation first and drops the ProSe direct discovery operation or defers the ProSe operation.

In general, it may be desirable to perform the aforementioned ProSe direct communication operation for communicating with other UEs in preference to the ProSe direct discovery operation for discovering a UE which can support D2D.

However, when the ProSe direct discovery operation is used with respect to critical operations or safety for services (e.g., V2X service), it may be desirable to apply higher priority to the ProSe direct discovery operation than the ProSe direct communication operation.

For example, in determination of priority for ProSe direction communication performed by a first UE out of the current cell coverage to communicate with a second UE adjacent to the first UE (it is assumed that the second UE is also located out of the cell coverage) and relay UE discovery (i.e., search for a relay UE) of the first UE, if higher priority is allocated to ProSe direct communication of the first UE for communication with the second UE as in the conventional method, the first UE may miss an opportunity to discovery a relay UE and thus lose an opportunity to transmit/receive data to/from a network.

Accordingly, it may be more desirable that the first UE discover a relay UE for connection with a network rather than performing ProSe direct communication with the second UE.

Accordingly, the present invention provides a method of assigning priorities to a ProSe direct discovery operation and a ProSe direct communication operation which will be performed by a UE such that the UE performs the ProSe direct discovery operation and/or the ProSe direct communication operation on the basis of the priorities. That is, the present invention provides a method by which a UE applies different priorities to a ProSe direct discovery operation and a ProSe direct communication operation on the basis of priority of each operation and a device using the same.

Specifically, when ProSe direct discovery and ProSe direct communication compete, a UE performs a ProSe operation (i.e., ProSe direct discovery and/or ProSe direct communication) on the basis of priorities assigned to ProSe direct discovery and ProSe direct communication instead of unconditionally performing ProSe direct communication first.

In addition, the present invention provides a method by which a UE performs one of ProSe direct discovery operations on the basis of priorities thereof when the ProSe direct discovery operations compete, in addition to a case in which ProSe direct discovery and ProSe direct communication compete.

Furthermore, the present invention provides a method by which a UE performs one of ProSe direct communication operations on the basis of priorities thereof when priorities of the ProSe direct communication operations compete.

Hereinafter, the ProSe direct discovery operation may be called a "discovery operation" and the ProSe direct communication operation may be called a "communication operation" for convenience of description of the present invention. In addition, discovery may be interchangeably used with "detection". For example, "ProSe direct discovery operation" can be interchangeably used with "ProSe direct detection operation".

Figure 13:
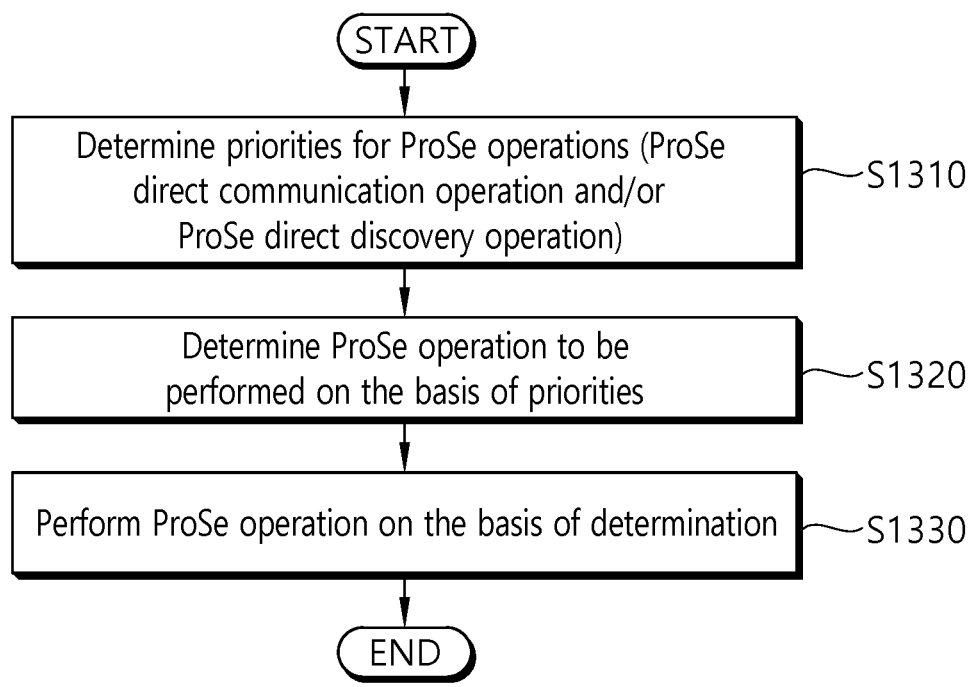
FIG. 13 is a flowchart illustrating a method of determining priority for each ProSe operation according to an embodiment of the present invention.

FIG. 13 is a flowchart illustrating a method of determining priority for each ProSe operation according to an embodiment of the present invention.

Referring to FIG. 13, a UE determines priority for each ProSe operation (ProSe direct communication operation and/or ProSe direct discovery operation) (S1310). Here, the UE may be a UE serving as a relay between a network and other UEs, that is, a relay UE. Alternatively, the UE may be a UE communicating with other UEs in the coverage of a cell or out of the coverage of the cell. Further, the UE may be a UE communicating with a network through a relay UE, that is, a remote UE. Here, the operation of the UE to determine priority for each ProSe operation will be described in detail.

1) With respect to a discovery operation, a discovery message can be correlated to a priority value. Here, the aforementioned correlation (i.e., correlation between the discovery message and the priority value) enables various methods.

a) An application which can be used as discovery may be correlated to priority.

Here, priorities can be allocated to different applications or different application categories. Then, priority of a discovery message is determined by priority related to an application which triggers a discovery announcement. That is, priority can be allocated per application, and a discovery message triggered by each application can also have priority depending on each application. Furthermore, priority may be allocated per application category, and a discovery message triggered by an application in each category can also have priority.

b) A priority value may be set by a network (e.g., ProSe function server).

For example, when a procedure for authorization of a discovery announcement or discovery is performed by a network node (e.g., ProSe function server), a priority value can be set by a network. In the case of allocation of other IDs related to a message associated with code allocation or transmission, a priority value may be set by the network. When other discovery announcement parameters are set, a priority value may be set by the network. That is, discovery message priority can be set by the network.

Using this method, different priorities can be assigned to a discovery announcement message used for public safety and a discovery announcement message for other purposes. Alternatively, priority may be exceptionally assigned to the discovery announcement message used for public safety (PS) and priority may not be assigned to the discovery announcement message for other purposes.

Using this method, different priorities can be assigned to a discovery announcement message used for D2D relay and a discovery announcement message for other purposes. Alternatively, priority may be exceptionally assigned to the discovery announcement message used for D2D relay and priority may not be assigned to the discovery announcement message for other purposes.

c) ProSe application code may be correlated to a priority value. That is, priority of a discovery message can be set depending on ProSe application code.

When a network allocates ProSe application code to a UE, priority correlated to the ProSe application code can also be allocated to the UE.

Using this method (i.e., correlating ProSe application code to a priority value), different priorities can be assigned to ProSe application code used for public safety and ProSe application code for other purposes. Alternatively, priority may be exceptionally assigned to the ProSe application code used for public safety and priority may not be assigned to the ProSe application code for other purposes.

Using this method, different priorities can be assigned to ProSe application code used for D2D relay and ProSe application code for other purposes. Alternatively, priority may be exceptionally assigned to the ProSe application code used for D2D relay and priority may not be assigned to the ProSe application code for other purposes.

d) Discovery message priority may be based on each UE. In this case, discoveries announced by a UE may have the same priority.

For example, in the case of a UE which can be used for public safety (PS), a discovery message transmitted by the UE may be correlated to specific priority. That is, an announced discovery message may have different priority values for UEs.

That is, discovery message priority can be determined per application unit triggering a discovery message (i.e., different discovery priority values can be determined for respective application units). In addition, discovery message priority can be determined per application category triggering a discovery message (i.e., different discovery priority values can be determined for respective application categories). Further, discovery message priority can have a value set by a network. In addition, discovery message priority can be set depending on ProSe application code. Further, discovery message priority may be based on each UE.

Here, a discovery message may include priority information related thereto. Alternatively, when an upper layer (e.g., ProSe protocol layer) of a UE sends a discovery message to a lower layer, a priority value of the discovery message may be set to the lower layer. That is, the upper layer of the UE can send the priority value along with the discovery message to the lower layer.

In addition, a priority value may be explicitly signaled to a UE through a network. Optionally, a priority value may be allocated to a UE as a predetermined value.

2) Communication may be associated with a priority value with respect to communication operation.

a) An application which can be used by communication may be correlated to priority.

Here, different priorities can be allocated to different applications or different application categories. Then, communication priority is determined by priority correlated to an application which triggers communication transmission. That is, priority can be allocated per application and communication transmission triggered by each application can have priority depending on each application. In addition, priority may be allocated per application category and communication transmission triggered by an application in each category may have priority.

b) A priority value may be set by a network (e.g., ProSe function server).

For example, when communication transmission or communication authorization is set, a priority value can be set by a network. In the case of allocation of L2 ID related to message transmission, a priority value can be set by the network. When other communication parameters are set, a priority value may be set by the network. That is, communication transmission priority can be set by the network.

c) Communication session priority may depend on each UE. In this case, communications transmitted by a UE may have the same priority.

For example, when a UE can be used for public safety (PS), communication transmission by the UE can be correlated to specific priority.

A UE ID may be correlated to a priority value.

A group related to a UE may be correlated to a priority value. Here, the priority value may be a group priority value.

d) Communication data priority may be based on packets.

A group ID with respect to data transmission of a UE may be correlated to a priority value. Here, the priority value may be a group priority value.

That is, communication transmission priority can be determined per application triggering communication transmission (i.e., priority values for different communication transmissions can be determined per application). In addition, communication transmission priority can be determined per application category triggering communication transmission (i.e., priority values for different communication transmissions can be determined per application category). Further, communication transmission priority may have a value set by a network. Communication transmission priority may be based on each UE. In addition, communication transmission priority may be determined per packet.

Here, data transmitted through communication can include priority information related to data transmission. Alternatively, when an upper layer (e.g., ProSe protocol layer) of a UE sends data to a lower layer, the aforementioned priority value may be set to the lower layer. That is, the upper layer of the UE can send the priority value along with the communication data to the lower layer.

In addition, a priority value may be explicitly signaled to a UE through a network. Optionally, a priority value may be allocated to a UE as a predetermined value.

Embodiments related to priority setting for each operation may be provided as follows.

For example, priority can be set such that a ProSe direct discovery message transmitted by a UE capable of performing public safety communication has the same priority as that of data transmitted through ProSe direct communication with respect to public safety communication. Alternatively, priority can be set such that a ProSe direct discovery message transmitted by a UE capable of performing public safety communication has higher priority than data transmitted through ProSe direct communication with respect to public safety communication.

For example, priority can be set such that a ProSe direct discovery message transmitted by a UE which can provide a sidelink relay service (or manages the sidelink relay service) has the same priority as that of data transmitted through ProSe direct communication with respect to public safety communication. Alternatively, priority can be set such that a ProSe direct discovery message transmitted by a UE which can provide the sidelink relay service (or manages the sidelink relay service) has higher priority than data transmitted through ProSe direct communication with respect to public safety communication.

For example, priority can be set such that a ProSe direct discovery message for a relay service, which is transmitted by a UE that provides the sidelink relay service has a priority equal to or higher than that of data transmitted through ProSe direct communication with respect to public safety communication.

For example, priority can be set such that a ProSe direct discovery message transmitted by a UE which can provide the sidelink relay service or manages the sidelink relay service has higher priority than a ProSe direct discovery message which is not related to the sidelink relay service.

For example, priority can be set such that a ProSe direct discovery message transmitted with respect to a V2X (vehicle-to-everything) application (or application category) has higher priority than a ProSe direct discovery message which is not related to the V2X service and/or the V2X application.

For example, priority can be set such that a ProSe direct discovery message transmitted with respect to the V2X (vehicle-to-everything) application (or application category) has higher priority than a ProSe direct communication message which is not related to the V2X service and/or the V2X application.

Then, the UE determines a ProSe operation to be performed on the basis of the priorities (S1320). That is, the UE can preferentially perform an operation having higher priority.

More specifically, when the UE cannot simultaneously support a plurality of operations, the UE can preferentially perform an operation having highest priority among the plurality of operations. Here, preferential execution of an operation having the highest priority by the UE may mean that, when multiple operations compete, the UE performs only an operation having highest priority and does not perform other operations.

When multiple operations compete, any one of the multiple operations may be randomly dropped if the multiple operations have the same priority value.

Here, if the UE can simultaneously perform the multiple operations, the UE can simultaneously perform the multiple operations.

Cases of ProSe operation which can be selected on the basis of priority may include 1. a case in which a discovery operation and a communication operation compete (i.e., discovery operation vs. communication operation), 2. a case in which different discovery operations compete (i.e., discovery operation vs. discovery operation) and 3. a case in which different communication operations compete (i.e., communication operation vs. communication operation). Here, specific embodiments of the aforementioned cases will be described later.

Then, the UE performs the determined ProSe operation on the basis of the determination result (S1330). More specifically, when the determined operation is the discovery operation, the UE can perform the discovery operation. When the determined operation is the communication operation, the UE can perform the communication operation. If the UE can simultaneously perform multiple operations, the UE may simultaneously perform multiple discovery operations, may simultaneously perform multiple communication operations or may simultaneously perform a communication operation and a discovery operation.

A description will be given of a priority determination method for each ProSe operation in 1. a case in which a discovery operation and a communication operation compete (i.e., discovery operation vs. communication operation), 2. a case in which different discovery operations compete (i.e., discovery operation vs. discovery operation) and 3. a case in which different communication operations compete (i.e., communication operation vs. communication operation) with reference to the drawings.

1. Case in Which a Discovery Operation and a Communication Operation Compete (i.e., Discovery Operation vs. Communication Operation)

Figure 14:
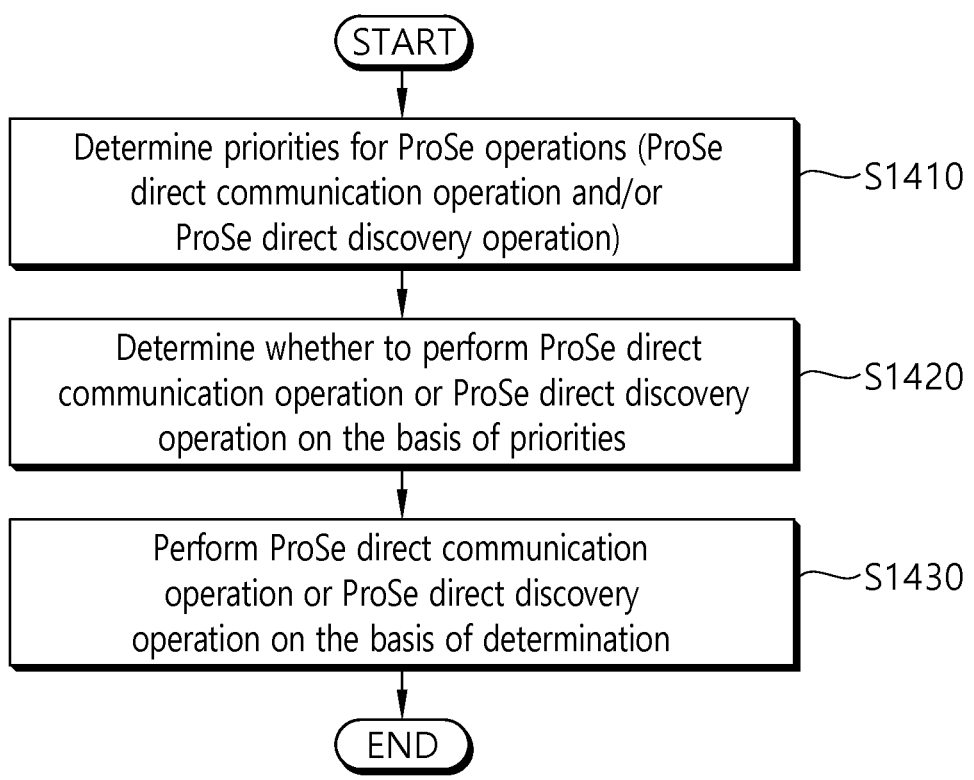
FIG. 14 is a flowchart illustrating a priority determination method for each ProSe operation according to another embodiment of the present invention.

FIG. 14 is a flowchart illustrating a priority determination method for each ProSe operation according to another embodiment of the present invention.

A UE determines priorities for ProSe operations (ProSe direct communication operation and/or ProSe direct discovery operation) (1410). Here, the operation of determining priority for each operation has been described above.

Subsequently, the UE determines whether to perform a ProSe direct communication operation or a ProSe direct discovery operation on the basis of the priorities (S1420). Determination of a ProSe operation on the basis of priority has been described above, and thus the UE operation when the ProSe direct communication operation and the ProSe direct discovery operation compete will be described hereinafter.

More specifically, when occurrence of the discovery operation and the communication operation at the same time (e.g., in the same subframe) is expected, the UE can perform the following operation.

1) If the UE cannot simultaneously perform multiple operations due to capability restriction, When the operations have different priories, the UE can drop an operation having lower priority. Optionally, the UE can defer the operation having lower priority to the next operation opportunity. In data transmission, the UE may transmit data having higher priority and may not transmit data having lower priority. Alternatively, the UE may attempt to transmit data having lower priority and transmit the data having lower priority as long as resources which do not collide with high-priority transmission are selected through re-execution of transmission resource selection.

If the operations have the same priority, the UE can drop an arbitrary operation. Optionally, the UE may defer an arbitrary operation to the next operation opportunity.

2) If the UE can simultaneously perform the multiple operations, the UE can simultaneously perform the multiple operations.

Subsequently, the UE performs the ProSe direct communication operation or the ProSe direct discovery operation on the basis of the determination result (S1430). Here, execution of the ProSe direct communication operation or the ProSe direct discovery operation by the UE has been described above.

2. Case in Which Different Discovery Operations Compete (i.e., Discovery Operation vs. Discovery Operation)

Figure 15:
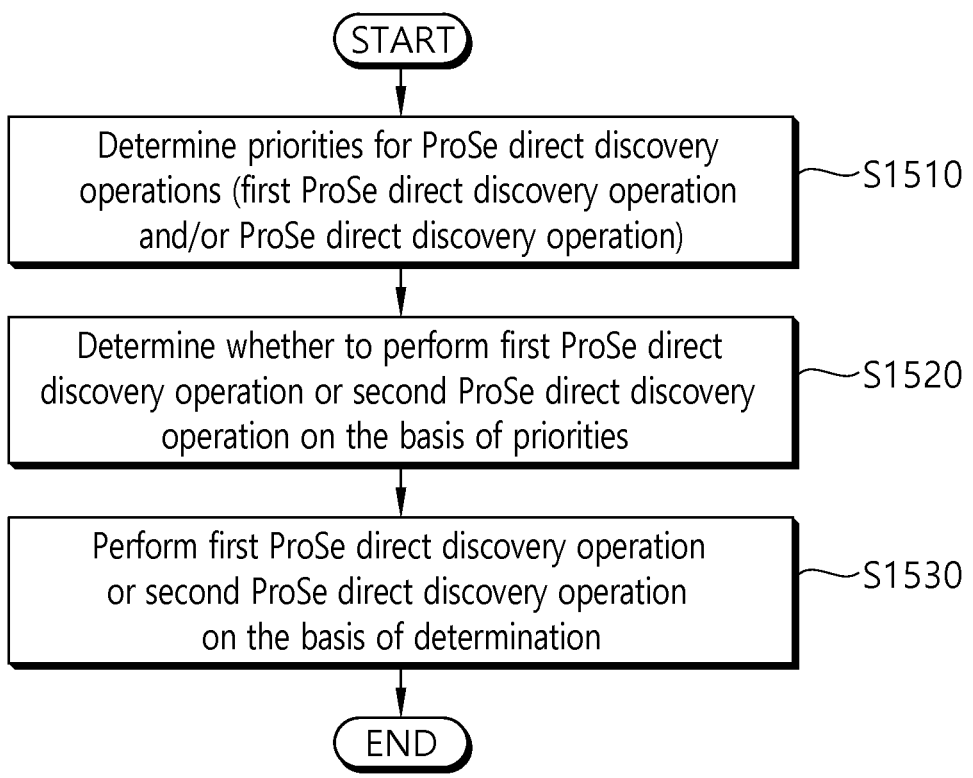
FIG. 15 is a flowchart illustrating a priority determination method for each ProSe operation according to another embodiment of the present invention.

FIG. 15 is a flowchart illustrating a priority determination method for each ProSe operation according to another embodiment of the present invention.

A UE determines priorities for ProSe direct discovery operations (first ProSe direct discovery operation and second ProSe direct discovery operation) (1510). Here, the operation of determining priority for each operation has been described above.

Subsequently, the UE determines whether to perform the first ProSe direct discovery operation or the second ProSe direct discovery operation on the basis of the priorities (S1520). Determination of a ProSe operation to be performed on the basis of priority has been described above, and thus the UE operation when the first ProSe direct discovery operation and the second ProSe direct discovery operation compete will be described hereinafter.

More specifically, when occurrence of two different discovery operations for different discovery messages at the same time (e.g., in the same subframe) is expected, that is, when occurrence of the first and second ProSe direct discovery operations at the same time (e.g., in the same subframe) is expected, the UE can perform the following operation.

1) If the UE cannot simultaneously perform multiple operations due to capability restriction, When the operations have different priories, the UE can drop a discovery operation having lower priority. In data transmission, the UE may transmit data having higher priority and may not transmit data having lower priority. Alternatively, the UE may attempt to transmit data having lower priority and transmit the data having lower priority as long as resources which do not collide with high-priority transmission are selected through re-execution of transmission resource selection. Optionally, the UE may defer the discovery operation having lower priority to the next operation opportunity.

If the operations have the same priority, the UE can drop an arbitrary discovery operation. Optionally, the UE may defer an arbitrary discovery operation to the next operation opportunity.

2) If the UE can simultaneously perform the multiple operations, the UE can simultaneously perform the multiple operations.

Subsequently, the UE performs the first ProSe direct discovery operation or the second ProSe direct discovery operation on the basis of the determination result (S1530). Here, execution of the first or second ProSe direct discovery operation by the UE has been described above.

3. Case in Which Different Communication Operations Compete (i.e., Communication Operation vs. Communication Operation)

Figure 16:
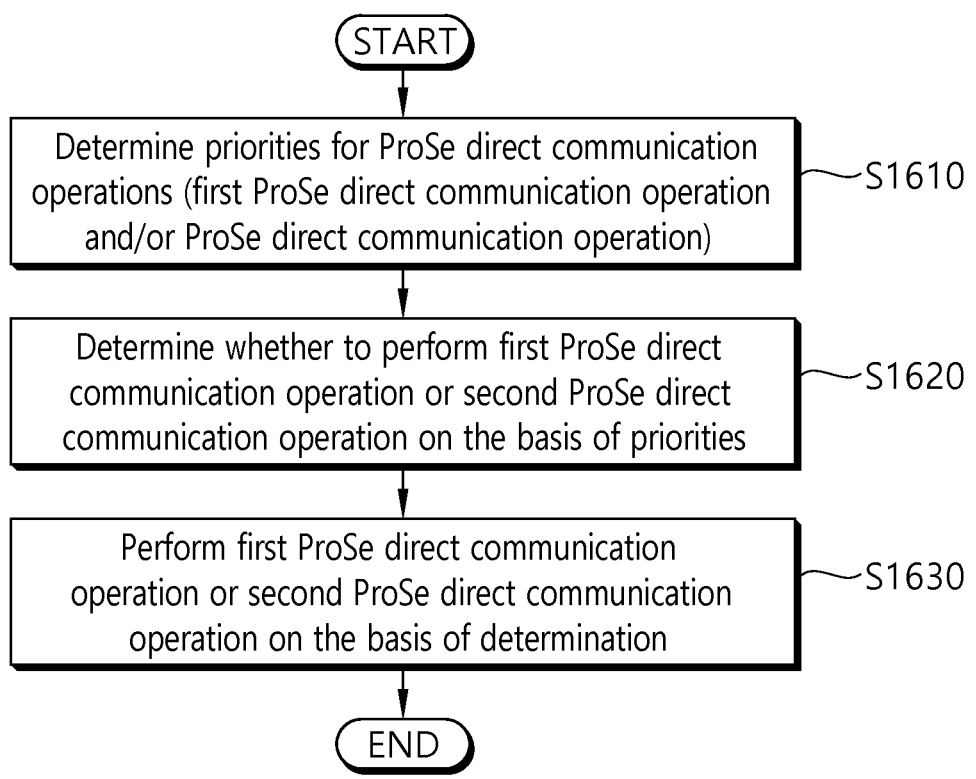
FIG. 16 is a flowchart illustrating a priority determination method for each ProSe operation according to another embodiment of the present invention.

FIG. 16 is a flowchart illustrating a priority determination method for each ProSe operation according to another embodiment of the present invention.

A UE determines priorities for ProSe direct communication operations (first ProSe direct communication operation and second ProSe direct communication operation) (1610). Here, the operation of determining priority for each operation has been described above.

Subsequently, the UE determines whether to perform the first ProSe direct communication operation or the second ProSe direct communication operation on the basis of the priorities (S1620). Determination of a ProSe operation to be performed on the basis of priority has been described above, and thus the UE operation when the first ProSe direct communication operation and the second ProSe direct communication operation compete will be described hereinafter.

More specifically, when occurrence of two different communication operations for different communication messages at the same time (e.g., in the same subframe) is expected, that is, when occurrence of the first and second ProSe direct communication operations at the same time (e.g., in the same subframe) is expected, the UE can perform the following operation.

1) If the UE cannot simultaneously perform multiple operations due to capability restriction, When the operations have different priories, the UE can drop a communication operation having lower priority. In data transmission, the UE may transmit data having higher priority and may not transmit data having lower priority. Alternatively, the UE may attempt to transmit data having lower priority and transmit the data having lower priority as long as resources which do not collide with high-priority transmission are selected through re-execution of transmission resource selection. Optionally, the UE may defer the communication operation having lower priority to the next operation opportunity.

If the operations have the same priority, the UE can drop an arbitrary communication operation. Optionally, the UE may defer an arbitrary communication operation to the next operation opportunity.

2) If the UE can simultaneously perform the multiple operations, the UE can simultaneously perform the multiple operations.

Subsequently, the UE performs the first ProSe direct communication operation or the second ProSe direct communication operation on the basis of the determination result (S1630). Here, execution of the first or second ProSe direct communication operation by the UE has been described above.

The above-described embodiments can be applied to the following cases.

When a UE enters an RRC connected state, the UE can indicate a list of carrier frequencies with respect to discovery announcement of the UE for reception or transmission of discovery or both thereof. The UE can indicate the carrier frequency list through transmission of sidelink UE information. Here, the indicated frequencies may be serving frequencies or non-serving frequencies.

Case 1: When a UE is interested in discovery announcement on a serving carrier frequency, the UE can announce discovery using ProSe configuration corresponding to a secondary cell. To indicate interest in transmission and transmission resource request, the UE can indicate the following information to a network.

Option 1: Both carrier frequency and physical cell ID of target non-serving cell Option 2: Serving cell index or serving cell carrier frequency as part of transmission resources, for example Option 3: Global cell ID of cell corresponding to carrier frequency Case 2: When a UE is interested in discovery announcement on a non-serving carrier frequency, the UE can announce discovery using ProSe configuration corresponding to a cell selected for ProSe on a carrier frequency. To indicate interest in transmission and transmission resource request, the UE can indicate the following information to a network.

Option 1: Both carrier frequency and physical cell ID of target non-serving cell Option 2: Global cell ID of cell corresponding to carrier frequency. Optionally, UE.

Option 2 of case 1+option 1 of case 2: this combination can be selected in order to reduce overhead signaling.

Option 1 of case 1+option 1 of case 1: a small signaling size difference is assumed. Here, it is desirable to provide normal operations of the two procedures. Then, option 1 can be used in both cases.

When the UE indicates a cell previously selected for ProSe to a network, and when a new cell to be used for ProSe is selected, the following operations can be applied.

The UE can trigger transmission of sidelink UE information in order to indicate change of cells selected for ProSe. That is, the UE can indicate a newly selected cell.

When resources corresponding to the newly selected cell cannot be used, the UE can defer ProSe operation (e.g., ProSe transmission).

When resources corresponding to the newly selected cell can be used, the UE can use the resources corresponding to the newly selected cell.

The UE can reselect a cell for ProSe from the same frequency as a result of reselection of an intra-frequency on a carrier frequency with respect to ProSe data transmission of the UE.

When the UE indicates data selected for ProSe to a network in advance and when the UE is no longer interested in announcement in the cell on the aforementioned frequency and any cell, the following operations can be applied.

The UE can trigger transmission of sidelink UE information for indicating that the UE is no longer interested in discovery announcement in the cell. Here, the UE can eliminate an interested cell from a list of frequencies.

The UE may defer ProSe operation (e.g., ProSe transmission).

The UE can reselect a cell for ProSe from the same frequency as a result of reselection of an intra-frequency on a carrier frequency with respect to ProSe data transmission of the UE.

When the network recognizes transmission resource pool parameters with respect to a cell corresponding to a frequency interested in discovery announcement of the UE immediately upon reception of the sidelink UE information indicating interest in ProSe transmission from the UE, it may be natural that the network should signal the resource pool parameters to a UE which performs announcement on other frequencies using the signaled resource pool parameters. That is, it may be desirable that a cell signal transmission resource pool parameters and subsidiary information corresponding to cells of other frequencies through dedicated signaling.

If the network does not recognize transmission resource pool parameters of other cells interested in discovery announcement of the UE, the network causes the UE to enter an interested UE announcement operation state on a different frequency for uplink scheduling. Then, the UE needs to drop discovery announcement based on the cellular prioritization principle when uplink scheduling overlaps discovery announcement. Dropping discovery announcement may deteriorate performance of discovery announcement on the frequency.

The present invention is applicable to ProSe direct communication transmission.

The above-described embodiments of the present invention can be applied in the following.

1. Generality

The first question is which RRC state (here, RRC states may include an RRC connected state and an RRC idle state, as described above) needs to consider supporting discovery on a non-serving cell and a secondary cell. To authorize setup of a flexible network and continuous ProSe operation, it is desirable to support discovery on a non-serving cell and a secondary cell for all RRC states.

Proposal 1: RAN can support ProSe direct discovery announcement on a non-serving cell and/or a secondary cell in the RRC idle and RRC connected states.

A list of PLMNs in which ProSe direct discovery is authorized may differ from a list of PLMNs in which cellular operation is authorized. When announcement on a non-primary cell (non-PCell) is discussed, the fact that the aforementioned announcement is generated only on a cell of PLMN corresponding to ProSe direct discovery for which discovery announcement is authorized can be estimated or secured.

Proposal 2: ProSe direct discovery announcement on a non-serving cell and/or a secondary cell can be limited to cells related to PLMN(s) in which ProSe direct discovery announcement is authorized.

Reception of ProSe direct discovery on a non-serving cell of a different frequency is not limited in 3GPP Rel-12.

2. Enhancement with Respect to RRC Idle

It is assumed that a UE camps on cell 1 at current frequency 1 in an RRC idle state and is interested in discovery announcement on cell 2 at frequency 2.

Approach 1: The UE changes primary cells using a modified inter-frequency cell reselection method and performs discovery announcement on a new primary cell.

Approach 2: The UE performs discovery announcement on an inter-frequency cell.

Approach 1 is based on Rel-12 in which discovery announcement is authorized only on a primary cell. The UE may need to be authorized to perform frequency prioritization in order to change the primary cell thereof to an inter-frequency cell which supports discovery announcement. The aforementioned approach (i.e., approach 1) is simple and minimizes required enhancement (e.g., permitting sufficient frequency prioritization). On the other hand, this approach (i.e., approach 1) has a disadvantage that a network cannot control the UE to camp on a frequency for discovery announcement through selection of a frequency from frequencies when a plurality of frequencies supporting discovery announcement is present (that is, the aforementioned camping frequency is close to approximately random from among the aforementioned frequencies). In addition, the aforementioned approach (i.e., approach 1) may not have any advantage from the viewpoint of the UE when cellular operation and discovery operation are simultaneously performed.

Approach 2 is based on elimination of restriction of Rel-12 (i.e., approach 2 is based on elimination of restriction elements of Rel-12). In addition to such mitigation, the UE can perform discovery announcement on a non-primary cell in an idle period of the current primary cell. When discovery announcement is executed without enhancement on a non-primary cell for a UE which cannot simultaneously perform discovery and cellular operations, it is expected that the quality of execution (i.e., execution of discovery announcement without special enhancement) is lower than execution quality of discovery announcement on a primary cell. The quality of execution decreases 1) when the current primary cell does not recognize a cell which is interested in discovery announced by a UE (i.e., a frequency interested in discovery announced by the UE is not recognized) and 2) when the current primary cell does not recognize correct time of a discovery opportunity on an interest cell (i.e., interest frequency) which is interested in discovery announced by the UE. Due to the aforementioned defects, the UE cannot perform cellular scheduling restriction for the benefits of discovery announcement on a non-primary cell as long as additional enhancement is not introduced.

Based on the aforementioned analysis, approach 2 needs to be a standard for enhancement for the RRC idle mode because idle mode UE management is important, and approach 2 does not affect UE camping operation in the idle mode. Note that direct communication transmission on a secondary cell or a non-serving cell is supported in Rel-12. It is desirable that direct communication and discovery operations of a UE be controllable any time as proposed in approach 2.

Proposal 3: Approach 2 is suitable as a standard. That is, discovery announcement is allowed on a non-primary cell.

In addition to approach 2, approach 1 has a definite advantage when cellular and discovery operations cannot be simultaneously performed. If reselection of another cell (e.g., low priority cell) is allowed, a UE can avoid frequency RF re-adjustment which requires discovery announcement on an inter-frequency.

Proposal 4: Approach 4 can be supported in enhancement for the RRC idle mode.

To support all the aforementioned proposals, the following additional issues need to be discussed.

Provisioning of transmission resource pool corresponding to non-primary cell (for approach 2)

Frequency prioritization (for approach 1)

<Provisioning of Transmission Resource Pool Corresponding to Non-Primary Cell>

If there is no assistance information about announcement on a non-serving cell, a UE needs to acquire SIB 19 (system information block 19) from a target non-serving cell. To acquire SIB 19, the UE needs to access MIB (master information block) prior to SIB 1. To avoid the above-described inefficient UE operation, transmission of assistance information about announcement assistance from a serving cell to the UE is considered. Here, examples of the assistance information may include cp-length, discPeriod, numRetx, numRepetition, tf-ResourceConfig and txParameters included in SL-DiscResourcePool.

Proposal 5: A cell can signal a transmission pool parameter corresponding to a cell of a different frequency in SIB 19.

Transmission resource allocation of a non-primary cell may require RSRP based resource pool selection. Then, the UE may need to know a measurement bandwidth according to resource pool selection on the basis of RSRP measurement of the cell. The UE can include a frequency interested in announce discovery during frequency information reselection and can recognize bandwidth measurement of the cell from SIB 15 of a primary cell. However, when the UE is interested in announce discovery on a frequency which is not listed in frequency information reselection, the UE needs to additionally signal a measurement bandwidth. Here, when provided resources affect a frequency which is not listed in reselection frequency information, the cell needs to signal a measured bandwidth as part of assistance information in SIB 19.

Proposal 6: A cell can signal assistance information about announcement in SIB 19. Here, the assistance information may include a measurement bandwidth.

To support discovery announcement (i.e., announcement on an inter-frequency) on a non-primary cell, a UE needs to select a cell used for discovery announcement first. It is desirable that the UE follow the principle applied to ProSe direct communication which performs additional intra-frequency reselection based on additional measurement. When RSRP based on transmission resource pool selection corresponds to an operation for announcement, such measurement can be used. The UE may need to perform measurement on the aforementioned cell. According to current measurement requirements, the UE need not measure a cell having lower priority than a primary cell. Discovery announcement on a non-primary cell may be deferred every discovery period in theory without additional measurement beyond the current requirements.

Proposal 7: When a UE in an RRC idle state is interested in announce discovery on a non-primary cell of an inter-frequency, the UE performs measurement on the cell (i.e., frequency) without considering priority of the UE frequency.

Proposal 8: Additional measurement defined for ProSe direct communication can be applied to measurement on a non-primary cell frequency at which a UE in an RRC idle state is interested in ProSe direct discovery.

Proposal 9: A UE can use other information about announcement on a frequency and resource pools without reading MIB, SIB 1 and SIB 19 of a cell immediately upon reception of assistance information corresponding to a resource pool parameter and a non-primary cell.

<Frequency Prioritization>

Proposal 10: A UE can be permitted to perform frequency prioritization for the purpose of discovery announcement.

Proposal 11: Frequency prioritization can be permitted only when the UE is allowed to camp on a cell having a prioritized frequency.

Proposal 12: Frequency prioritization can be permitted only for a cell related to PLMN(s) to which ProSe direct discovery announcement is applied.

3. Enhancement for RRC Connect

There are three scenarios which can be considered for discovery announcement in an RRC connected state.

Announcement on primary cell

Announcement on secondary cell

Announcement on non-serving cell (e.g., inter-frequency cell)

Here, the first scenario is supported in Rel-12 and the remaining two scenarios require the following discussion. The first discussion is whether transmission on a non-secondary cell is permitted while a UE is configured with a secondary cell on a carrier frequency. We consider that permission of announcement on a non-secondary cell on a secondary carrier is not appropriate. If not (i.e., when announcement on a non-secondary cell is permitted on a secondary carrier), interference may be generated with uplink of the secondary cell.

Proposal 13: For discovery announcement on a serving frequency, a UE is permitted to perform announcement only on a serving cell (secondary cell or primary cell).

Similar discussion is required for discovery announcement on a non-serving frequency. Accordingly, it is necessary to determine whether discovery on a best-ranked cell is permitted on a non-serving frequency. As described above, for ProSe direct communication, a UE for ProSe direct discovery announcement on a no-serving frequency makes it a rule to use the best-ranked cell on the frequency. Then, the following requirements are needed.

Proposal 14: When a UE in an RRC connected state is interested in discovery announcement on a non-serving cell (i.e., inter-frequency cell), measurement can be performed on the cell frequency even when a measurement target is not set to the frequency.

Proposal 15: Additional measurement defined for ProSe direct communication can be applied to measurement on a non-primary cell frequency at which a UE in an RRC connected state is interested in ProSe direct discovery announcement.

Proposal 16: Additional measurement defined for ProSe direct communication can be applied to measurement on a non-primary cell frequency.

When a UE enters an RRC connected state, the UE can indicate interest in reception, transmission or transmission/reception of discovery by transmitting sidelink UE information.

A UE may be interested in announcing discovery on a specific secondary cell. In this case, the UE can indicate a serving cell index as part of a transmission resource request, for example, or indicate a carrier frequency of a serving cell.

When it is assumed that a signaling size is small, it may be desirable that normal operation be performed for both procedures.

Proposal 17: A UE can indicate a list of carrier frequencies at which the UE is interested in announcement in sidelink UE information. Here, the indicated frequencies may be a serving frequency and a non-serving frequency.

Proposal 18: A UE may indicate a carrier frequency at which the UE is interested in announcement in sidelink UE information.

With respect to proposed restrictions on announcement, announcement on a primary cell or a secondary cell for discovery announcement on a serving frequency can also be applied to triggering of sidelink UE information.

Proposal 19: Discussed in the future

A UE may be interested in announcing discovery on a specific secondary cell. In this case, the UE can indicate a serving cell index as part of a transmission resource request or indicate a carrier frequency of a serving cell. The UE may be interested in announcing on an inter-frequency non-serving cell. In this case, the UE can indicate a carrier frequency of a target non-serving cell. When a signaling size difference is estimated to be small, it is desirable that a common operation be provided for both cases.

Proposal 20: A UE has capability of indicating a list of carrier frequencies at which the UE is interested in announcement in sidelink UE information.

If an eNB recognizes resource pool parameter transmission to a cell of a frequency at which the UE is interested in announcing discovery, it is natural that the UE signals resource pool parameters to a UE which can perform announcement at a difference frequency using signaled resource pool parameters. This corresponds to a case in which the UE is interested in announcement on a secondary carrier.

Proposal 21: A cell can perform signaling in dedicated signaling transmission resource pool parameters and assistance information corresponding to a cell of a different frequency.

If an eNB does not recognize transmission resource pool parameters for a cell of a different frequency at which a UE is interested in announcing discovery, the eNB may not consider uplink scheduling of interest UE announcement operation at the different frequency. Then, the UE needs to drop discovery announcement based on the cellular prioritization principle whenever discovery announcement overlaps uplink scheduling. This causes deterioration of performance of discovery announcement on the frequency.

One solution is that an available UE reports transmission resource pool parameters corresponding to a cell of a frequency at which the UE is interested in announcing discovery. For example, if a serving cell of a UE is not aware of a transmission resource pool of another cell in which the UE is interested in announcing discovery, the UE can provide a report in sidelink UE information when transmission resources are requested.

Proposal 22: Introduction of a UE reporting mechanism through which a UE reports transmission resource pool parameters corresponding to a cell of a different frequency to a serving cell thereof along with time information can be considered.

<UE Capability>

Presently, a UE reports only a band supported for discovery to an eNB and does not report information on simultaneous execution of D2D and cellular operations. This is acceptable only when discovery announcement is limited as in Rel-12. However, to support discovery on a secondary carrier or a non-serving carrier, the existing capability may be insufficient. For example, the eNB may not recognize whether restriction on cellular uplink scheduling is applied by assisting discovery announcement on a different frequency. When the focus of discussion is limited to discovery transmission, whether a UE simultaneously supports discovery transmission and cellular transmission in a combination of interested bands is useful knowledge from the viewpoint of the eNB.

Proposal 23: UE capability signaling with respect to discovery is enhanced by enabling indication of simultaneous execution of discovery transmission and cellular transmission for each band combination.

Figure 17:
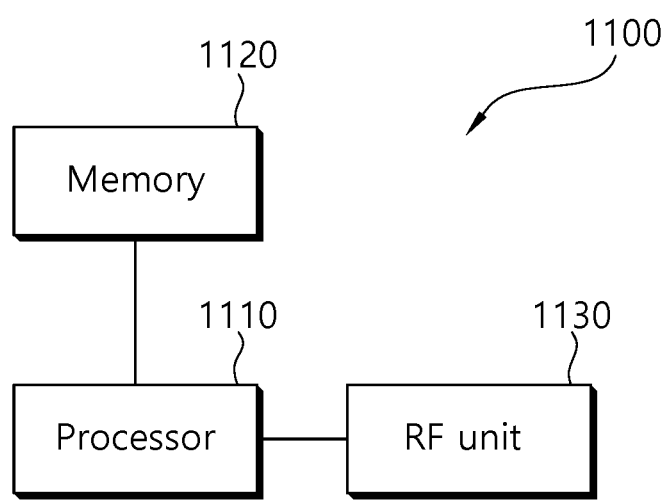
FIG. 17 is a block diagram illustrating a UE which realizes embodiments of the present invention.

FIG. 17 is a block diagram illustrating a UE which realizes embodiments of the present invention.

Referring to FIG. 17, a UE 1100 includes a processor 1110, a memory 1120 and a radio frequency (RF) unit 1130. The processor 1110 realizes the proposed functions, procedures and/or methods. For example, the processor 1110 can determine priorities for ProSe operations (ProSe direct communication operation and/or ProSe direct discovery operation). In addition, the processor 1110 can determine a ProSe operation to be performed on the basis of the priorities. Further, the processor 1110 can perform the ProSe operation through the RF unit 1130 on the basis of the determination result.

The RF unit 1130 is connected to the processor 1110 and transmits/receives RF signals.

The processor may include an ASIC (application-specific integrated circuit), other chipsets, a logic circuit and/or a data processor. The memory may include a ROM (read-only memory), a RAM (random access memory), a flash memory, a memory card, a storage medium and/or other storage devices. The RF unit may include a baseband circuit for processing RF signals. When embodiments are realized by software, the above-described methods can be realized by modules (procedures, functions, etc.) which perform the aforementioned functions. The modules may be stored in the memory and executed by the processor. The memory may be provided inside or outside the processor and connected to the processor through various known means.

What is claimed is:

1. A method for performing one of a sidelink discovery or a sidelink communication in a wireless communication system, the method performed by a user equipment (UE) and comprising:
   determining a priority for the sidelink discovery and a priority for the sidelink communication when the sidelink discovery competes with the sidelink communication; and
   performing one of the sidelink discovery or the sidelink communication based on the determined priority for the sidelink communication and the priority for the sidelink discovery,
   wherein when the sidelink discovery is a sidelink discovery announcement related to a sidelink relay operation, the UE prioritizes the sidelink discovery rather than the sidelink communication and performs the sidelink discovery.

2. The method of claim 1, wherein the sidelink communication includes a sidelink communication for a public safety communication or a sidelink communication for a data communication.

3. The method of claim 1, wherein
   the sidelink communication is an operation for communicating between the UE and another UE.

4. The method of claim 1, wherein the sidelink discovery is an operation for discovering another UE by the UE.

5. A user equipment comprising:
a transceiver configured to transmit and receive signals; and
a processor connected to the transceiver to operate,
wherein the processor is configured to:
   determine a priority for a sidelink discovery and a priority for a sidelink communication when the sidelink discovery competes with the sidelink communication; and
   perform one of the sidelink discovery or the sidelink communication based on the determined priority for the sidelink communication and the priority for the sidelink discovery,
   wherein when the sidelink discovery is a sidelink discovery announcement related to a sidelink relay operation, the UE prioritizes the sidelink discovery rather than the sidelink communication and performs the sidelink discovery.

* * * * *